(12) United States Patent
Sung

(10) Patent No.: US 10,787,114 B2
(45) Date of Patent: Sep. 29, 2020

(54) HEADLAMP CONTROL APPARATUS AND METHOD

(71) Applicant: HYUNDAI MOBIS CO., LTD., Seoul (KR)

(72) Inventor: Jun Young Sung, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 16/582,111

(22) Filed: Sep. 25, 2019

(65) Prior Publication Data
US 2020/0130562 A1 Apr. 30, 2020

(30) Foreign Application Priority Data

Oct. 26, 2018 (KR) .................. 10-2018-0128996

(51) Int. Cl.
| | | |
|---|---|---|
| *B60Q 1/08* | (2006.01) | |
| *B60Q 1/28* | (2006.01) | |
| *B60Q 1/18* | (2006.01) | |
| *F21S 41/60* | (2018.01) | |

(52) U.S. Cl.
CPC ............ *B60Q 1/085* (2013.01); *B60Q 1/18* (2013.01); *B60Q 1/28* (2013.01); *F21S 41/60* (2018.01)

(58) Field of Classification Search
CPC .. B60Q 1/085; B60Q 1/18; B60Q 1/28; F21S 41/60
USPC ........................................................ 362/466
See application file for complete search history.

(56) References Cited

U.S. PATENT DOCUMENTS

| | | | | |
|---|---|---|---|---|
| 8,538,636 | B2* | 9/2013 | Breed | B60N 2/002 315/77 |
| 2002/0085387 | A1* | 7/2002 | Taniuchi | B60Q 1/085 362/538 |
| 2008/0249706 | A1* | 10/2008 | Bradai | B60Q 1/085 701/532 |
| 2014/0293633 | A1* | 10/2014 | Matsumoto | F21V 1/10 362/512 |
| 2016/0090025 | A1* | 3/2016 | Nagasawa | B60Q 1/143 362/466 |
| 2018/0290583 | A1* | 10/2018 | Park | B60Q 1/1423 |

FOREIGN PATENT DOCUMENTS

KR 10-1491343 B1 2/2015

* cited by examiner

*Primary Examiner* — Bryon T Gyllstrom
(74) *Attorney, Agent, or Firm* — Knobbe Martens Olson & Bear LLP

(57) ABSTRACT

A headlamp control apparatus may include: an image acquisition unit configured to acquire a forward image of a vehicle; a driving information acquisition unit configured to acquire driving information including one or more of driving environment information and driving state information of the vehicle; and a control unit configured to decide a shadow area for a position of a forward vehicle, which is recognized based on the forward image acquired by the image acquisition unit, and control light emission of a headlamp according to the decided shadow area, wherein the control unit controls the light emission of the headlamp by variably adjusting the shadow area based on the driving information acquired by the driving information acquisition unit.

6 Claims, 4 Drawing Sheets

HEADLAMP CONTROL APPARATUS AND METHOD

CROSS-REFERENCES TO RELATED APPLICATIONS

The present application claims priority to Korean application number 10-2018-0128996, filed on Oct. 26, 2018, which is incorporated by reference in its entirety.

BACKGROUND OF THE INVENTION

The present invention relates to a headlamp control apparatus and method, and more particularly, to a headlamp control apparatus and method which can control a shadow area of a headlamp.

Recently, a headlamp for a vehicle has evolved into a headlamp that emits light by actively reacting with a road and surrounding environment from a headlamp that passively emits light. Furthermore, a headlamp that increases luminance on a dark road and decreases luminance on a bright road is also applied. In addition, a headlamp control technique is applied, which can minimize glare of a driver of a forward vehicle such as a preceding vehicle that travels in the same direction as an ego vehicle or an opposite vehicle that travels in the opposite direction of the ego vehicle and approaches the ego vehicle.

Recently, research is being actively conducted on various intelligent headlamp systems including an adaptive driving beam (ADB) headlamp system. The ADB headlamp system, which is a camera-interconnected headlamp system, emits high-beam when a camera mounted at the front of an ego vehicle recognizes no forward vehicles or a light source from a forward vehicle is not recognized by the camera, and emits low-beam for preventing glare into the area of a forward vehicle by calculating the outermost angle of the forward vehicle when the forward vehicle is recognized by the camera or a light source from the forward vehicle is recognized by the camera, and emits high-beam in the other area excluding the area of the forward vehicle. The ADB headlamp system may be divided into a swivel-type headlamp system using a swivel actuator and a matrix-type headlamp system using LED on/off. The ADB headlamp system can improve the forward visibility of the driver in the ego vehicle, and prevent glare of a driver in the forward vehicle.

In order to prevent glare of a driver in a forward vehicle, a correct glare free area (GFA) or shadow area needs to be set for the forward vehicle. At the moment, however, the setting of the shadow area completely relies on a camera image processing algorithm that recognizes a light source from a forward vehicle through a camera. Therefore, the setting of the shadow area cannot follow a position change between the ego vehicle and the forward vehicle under a severe driving environment where the relative position between the ego vehicle and the forward vehicle is rapidly changed, due to a limit to image processing speed of the camera. As a result, the driver in the forward vehicle inevitably feels glare.

In order to prevent the driver in the forward vehicle from feeling glare, an expansion of the shadow area may be considered. However, an excessive shadow area may reduce the visibility of the driver in the ego vehicle, thereby degrading the performance of the ADB headlamp system. That is, the shadow area and the performance of the ADB headlamp system have a trade-off relationship. Therefore, it is necessary to optimize the shadow area in the severe driving environment where the relative position between the ego vehicle and the forward vehicle is rapidly changed.

The related art of the present invention is disclosed in Korean Patent No. 10-1491343 published on Feb. 6, 2015.

SUMMARY OF THE INVENTION

Embodiments of the present invention are directed to a headlamp control apparatus and method which can optimize a shadow area in a severe driving environment where a relative position between an ego vehicle and a forward vehicle rapidly changes, thereby preventing glare of a driver in the forward vehicle.

In one embodiment, a headlamp control apparatus may include: an image acquisition unit configured to acquire a forward image of a vehicle; a driving information acquisition unit configured to acquire driving information including one or more of driving environment information and driving state information of the vehicle; and a control unit configured to decide a shadow area for a position of a forward vehicle, which is recognized based on the forward image acquired by the image acquisition unit, and control light emission of a headlamp according to the decided shadow area, wherein the control unit controls the light emission of the headlamp by variably adjusting the shadow area based on the driving information acquired by the driving information acquisition unit.

The shadow area may include a shadow area main region and a shadow area margin region. The control unit may decide a region corresponding to the position of the forward vehicle as the shadow area main region, and decide the left and right sides of the shadow area main region as the preset shadow area margin region, in order to control the light emission of the headlamp, wherein the control unit controls the light emission of the headlamp by variably adjusting the shadow area margin region based on the driving information.

The driving environment information may include lane information of a road on which the vehicle is traveling. The control unit variably may adjust the shadow area margin region based on the magnitude and direction of the curvature of the road, determined from the lane information.

The control unit may expand the shadow area margin region only when the magnitude of the curvature of the road is equal to or more than a preset reference curvature, wherein as the magnitude of the curvature of the road increases, the control unit further expands the shadow area margin region.

The control unit may expand a left shadow area margin region when the direction of the curvature of the road is right, and expand a right shadow area margin region when the direction of the curvature of the road is left.

The driving state information may include a steering angle of a steering wheel of the vehicle, wherein the control unit variably adjusts the shadow area margin region based on the magnitude and direction of the steering angle.

The control unit may expand the shadow area margin region only when the magnitude of the steering angle is equal to or more than a preset reference steering angle, wherein as the magnitude of the steering angle is increased, the control unit further expands the shadow area margin region.

The control unit may expand a left shadow area margin region when the direction of the steering angle is right, and expand a right shadow area margin region when the direction of the steering angle is left.

In another embodiment, a headlamp control method may include: acquiring, by an image acquisition unit, a forward image of a vehicle; acquiring, by a driving information acquisition unit, driving information including one or more of driving environment information and driving state information of the vehicle; and deciding, by a control unit, a shadow area for a position of a forward vehicle, which is recognized based on the forward image acquired by the image acquisition unit, and controlling light emission of a headlamp according to the decided shadow area, wherein the control unit controls the light emission of the headlamp by variably adjusting the shadow area based on the driving information acquired by the driving information acquisition unit.

In accordance with the embodiments of the present invention, the headlamp control apparatus and method can variably adjust the shadow area of the headlamp according to the curvature of the road or the steering state of the vehicle, and optimize the shadow area in a severe driving environment where a relative position between the ego vehicle and the forward vehicle is rapidly changed, thereby removing glare of the driver of the forward vehicle. Therefore, the headlamp control apparatus and method can compensate for the degradation in adjustment performance of the shadow area due to the limit to the image processing speed of the camera in the related art, thereby improving the performance of the ADB headlamp system.

DESCRIPTION OF SPECIFIC EMBODIMENTS

Hereafter, a headlamp control apparatus and method in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

In the following descriptions, a headlamp in accordance with an embodiment of the present invention will be described as an example of a headlamp which is applied to an adaptive driving beam (ADB) headlamp system.

Figure 1:
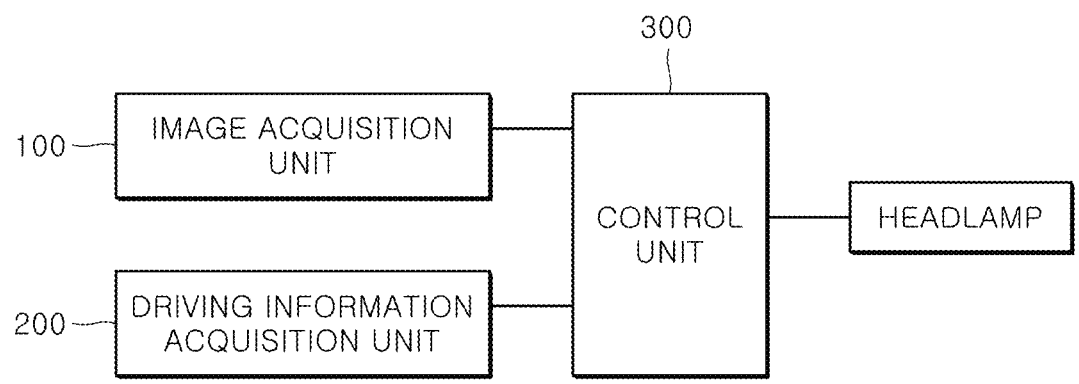
FIG. 1 is a block diagram illustrating a headlamp control apparatus in accordance with an embodiment of the present invention.

FIG. 1 is a block diagram illustrating a headlamp control apparatus in accordance with an embodiment of the present invention.

Referring to FIG. 1, the headlamp control apparatus in accordance with the embodiment of the present invention may include an image acquisition unit 100, a driving information acquisition unit 200 and a control unit 300.

The image acquisition unit 100 may acquire a forward image of a vehicle. The image acquisition unit 100 may be implemented as a camera sensor which is applied to an ADB headlamp system and recognizes a light source from a forward vehicle.

The driving information acquisition unit 200 may acquire driving information of the vehicle, and the driving information of the vehicle may include one or more of driving environment information and driving state information.

The driving environment information may include lane information of the road on which the vehicle is traveling, and the driving information acquisition unit 200 may acquire lane information used in an LKAS (Lane Keeping Assist System) or LDWS (Lane Departure Warning System) applied to the vehicle through a method of receiving the lane information from each of the systems.

The driving state information may include a steering angle of a steering wheel mounted in the vehicle, and the driving information acquisition unit 200 may acquire the steering angle of the steering wheel through a steering angle sensor.

The control unit 300 may decide a shadow area for the position of the forward vehicle, which is recognized based on the forward image acquired by the image acquisition unit 100, and control light emission of a headlamp according to the decided shadow area. The forward vehicle may indicate a preceding vehicle that travels in the same direction as the traveling direction of the vehicle or an opposite vehicle that travels in the opposite direction of the traveling direction of the vehicle and approaches the vehicle. The control unit 300 may recognize a light source of the forward vehicle in the forward image acquired by the image acquisition unit 100, decide a shadow area for the position of the forward vehicle by calculating the outermost angle of the forward vehicle, and control the light emission of the headlamp according to the decided shadow area. The light emission control method of the control unit 300 for the headlamp may include a swivel-type method based on a swivel actuator or a matrix-type method based on LED array on/off of the headlamp.

The shadow area may include a shadow area main region and a shadow area margin region. The control unit 300 may decide a region corresponding to the position of the forward vehicle as the shadow area main region, and decide the left and right sides of the shadow area main region as the shadow area margin region (i.e. left shadow area margin region and right shadow area margin region), in order to prevent glare of a driver in the forward vehicle. The initial size of the shadow area margin region may be designed in various manners in consideration of the specification of the lamp and the intention of a designer.

At this time, under a severe driving environment where the vehicle travels on a curved road or the driver performs steering at a steering angle equal to or more than a predetermined value, the position of the forward vehicle based on the vehicle may be rapidly changed, and the size setting of the shadow area by the control unit 300 may not follow the position change of the forward vehicle due to a limit to the image processing speed of the camera. Therefore, the forward vehicle may rapidly escape from the shadow area margin region. In this case, the driver of the forward vehicle may feel glare.

The headlamp control apparatus in accordance with the present embodiment may employ the configuration that optimizes the shadow area in the severe driving environment by variably adjusting the shadow area based on the driving information acquired by the driving information acquisition unit 200, and controls the light emission of the headlamp to prevent glare felt by the driver in the forward vehicle.

First, the configuration for variably adjusting the shadow area in consideration of the driving environment information will be described.

As described above, the driving environment information may include lane information of the road on which the vehicle is traveling, and the control unit 300 may analyze the lane information of the road, received from the driving information acquisition unit 200, and determine the quality of the lane information. The determining of the quality of the lane information may be a precondition for calculating the direction and magnitude of the curvature of the road and ensuring the precision of the adjustment of the shadow area margin region.

When it is determined that the quality of the lane information is equal to or more than a preset value, the control unit 30 may variably adjust the shadow area margin region based on the magnitude and direction of the curvature of the road, determined from the lane information.

In relation to the magnitude of the curvature of the road, the control unit 300 may expand the shadow area margin region only when the magnitude of the curvature of the road is equal to or more than a preset reference curvature. At this time, as the magnitude of the curvature of the road increases, the control unit 300 may further expand the shadow area margin region.

That is, when the magnitude of the curvature of the road is less than the reference curvature, that is, when a position change of the forward vehicle is not relatively large, glare of the driver in the forward vehicle can be prevented only by the currently set shadow area without adjusting the shadow area margin region. Therefore, the control unit 300 may expand the shadow area margin region only when the magnitude of the curvature of the road is equal to or more than the preset reference curvature. The reference curvature may be designed in various manners based on a designer's intention and experimental results, and set in the control unit 300 in advance.

As the magnitude of the curvature of the road increases, the position of the forward vehicle may be significantly changed. In this case, the forward vehicle may more rapidly escape from the currently set shadow area margin region. Therefore, the control unit 300 may further expand the shadow area margin region as the magnitude of the curvature of the road increases.

In relation to the direction of the curvature of the road, the control unit 300 may expand the left shadow area margin region when the direction of the curvature of the road is right, and expand the right shadow area margin region when the direction of the curvature of the road is left.

That is, when the direction of the curvature of the road on which the vehicle is traveling is right, the forward vehicle may be positioned on the left of a reference axis extended in the longitudinal direction of the vehicle. Therefore, the control unit 300 may expand the left shadow area margin region such that the forward vehicle is included in the expanded shadow area margin region. Furthermore, when the direction of the curvature of the road on which the vehicle is traveling is left, the forward vehicle may be positioned on the right of the reference axis extended in the longitudinal direction of the vehicle. Therefore, the control unit 300 may expand the right shadow area margin region such that the forward vehicle is included in the expanded shadow area margin region.

Next, the configuration for variably adjusting the shadow area in consideration of the driving state information will be described.

As described above, the driving state information may include the steering angle of the steering wheel of the vehicle. Thus, the control unit 300 may variably adjust the shadow area margin region based on the magnitude and direction of the steering angle.

In relation to the magnitude of the steering angle, the control unit 300 may expand the shadow area margin region only when the magnitude of the steering angle is equal to or more than a preset reference steering angle. At this time, as the magnitude of the steering angle is increased, the control unit 300 may further expand the shadow area margin region.

That is, when the magnitude of the steering angle is less than the reference steering angle, that is, when a lateral position change of the vehicle is not relatively large, glare of the driver in the forward vehicle can be prevented only by the currently set shadow area without adjusting the shadow area margin region. Therefore, the control unit 300 may expand the shadow area margin region only when the magnitude of the steering angle is equal to or more than the preset reference steering angle. The reference steering angle may be designed in various manners based on a designer's intention and experimental results, and set in the control unit 300 in advance.

As the magnitude of the steering angle is increased, the position of the vehicle may be significantly changed in the lateral direction. In this case, the forward vehicle may more rapidly escape from the currently set shadow area margin region. Therefore, the control unit 300 may further expand the shadow area margin region as the magnitude of the steering angle is increased.

In relation to the direction of the steering angle, the control unit 300 may expand the left shadow area margin region when the direction of the steering angle is right, and expand the right shadow area margin region when the direction of the steering angle is left.

Specifically, when the direction of the steering angle is right, the forward vehicle may be positioned on the left of the reference axis extended in the longitudinal direction of the vehicle. Therefore, the control unit 300 may expand the left shadow area margin region such that the forward vehicle is included in the expanded shadow area margin region. Furthermore, when the direction of the steering angle is left, the forward vehicle may be positioned on the right of the reference axis extended in the longitudinal direction of the vehicle. Therefore, the control unit 300 may expand the right shadow area margin region such that the forward vehicle is included in the expanded shadow area margin region.

Figure 2:
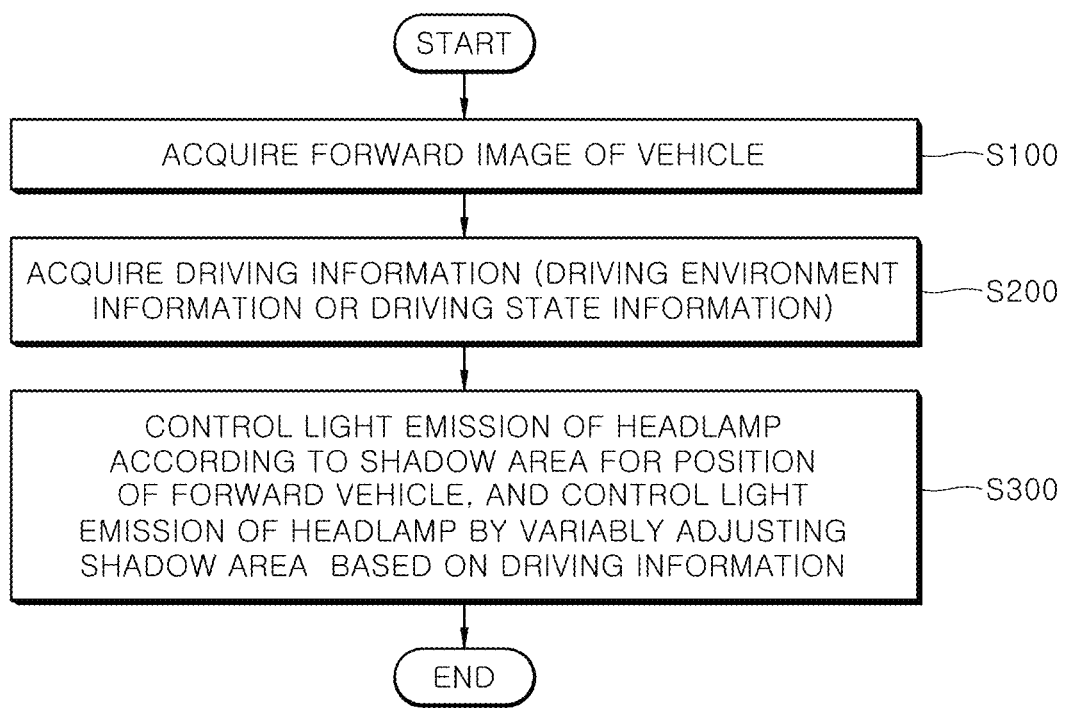
FIGS. 2 and 4 are flowcharts illustrating a headlamp control method in accordance with an embodiment of the present invention.
Figure 4:
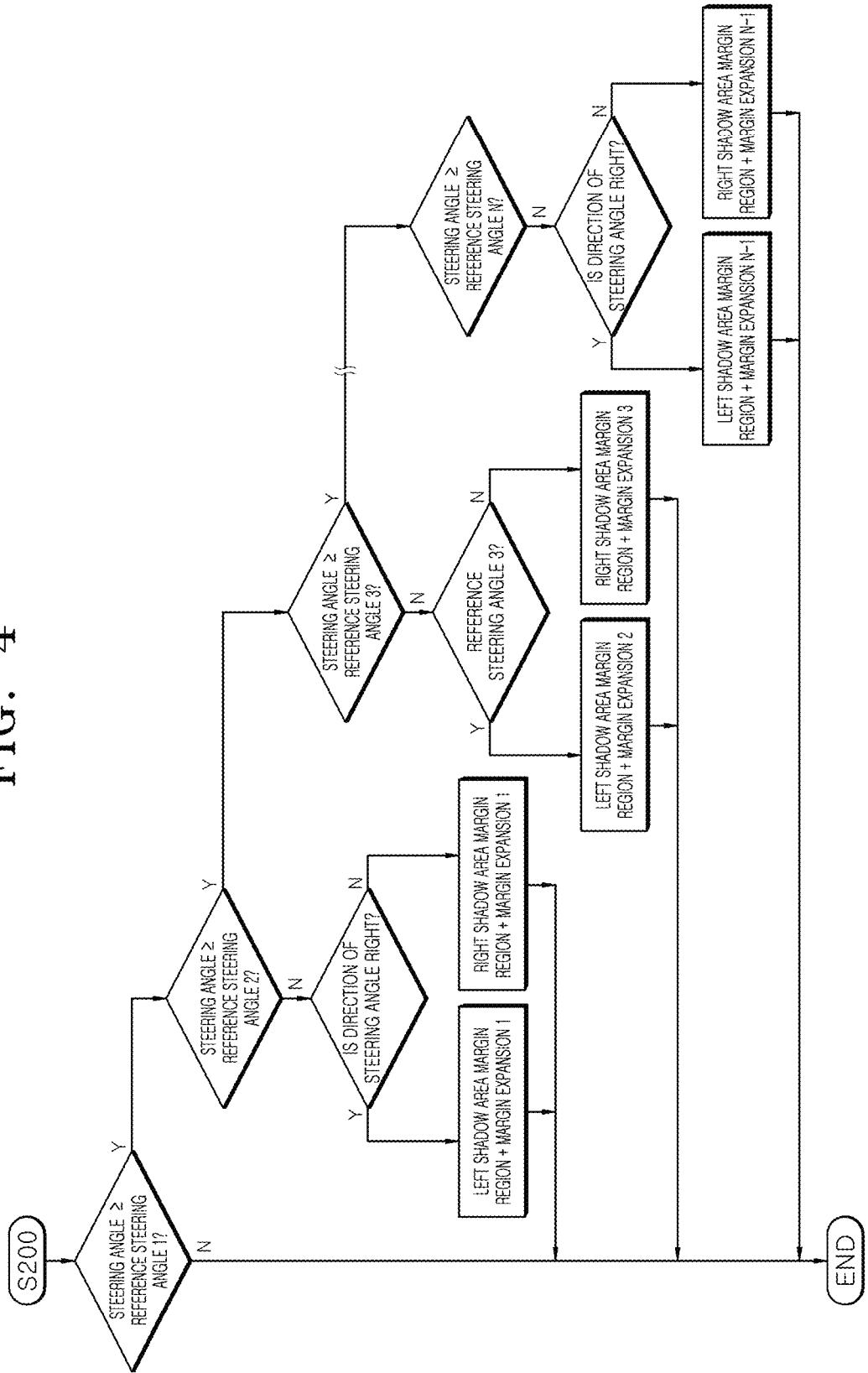

FIGS. 2 and 4 are flowcharts illustrating a headlamp control method in accordance with an embodiment of the present invention.

Referring to FIG. 2, the headlamp control method in accordance with the embodiment of the present invention will be described as follows. First, the image acquisition unit 100 acquires a forward image of the vehicle in step S100.

Then, the driving information acquisition unit 200 may acquire driving information including one or more of driving environment information and driving state information of the vehicle, in step S200.

Then, the control unit 300 may decide a shadow area for the position of the forward vehicle, which is recognized based on the forward image acquired in step S100, and control light emission of the headlamp according to the decided shadow area, in step S300. At this time, the control unit 300 may control the light emission of the headlamp by variably adjusting the shadow area based on the driving information acquired in step S200, in step S300.

The shadow area may include a shadow area main region and a shadow area margin region. Thus, in step S300, the control unit 300 may decide a region corresponding to the position of the forward vehicle as the shadow area main region, and decide the left and right sides of the shadow area main region as the shadow area margin region, in order to control light emission of the headlamp. At this time, the control unit 30 may control the light emission of the headlamp by variably adjusting the shadow area margin region based on the driving information.

The driving environment information may include lane information of the road on which the vehicle is traveling. Thus, step S300 may include step S310 in which the control unit 300 variably adjusts the shadow area margin region based on the magnitude and direction of the curvature of the road, which is determined from the lane information.

Figure 3:
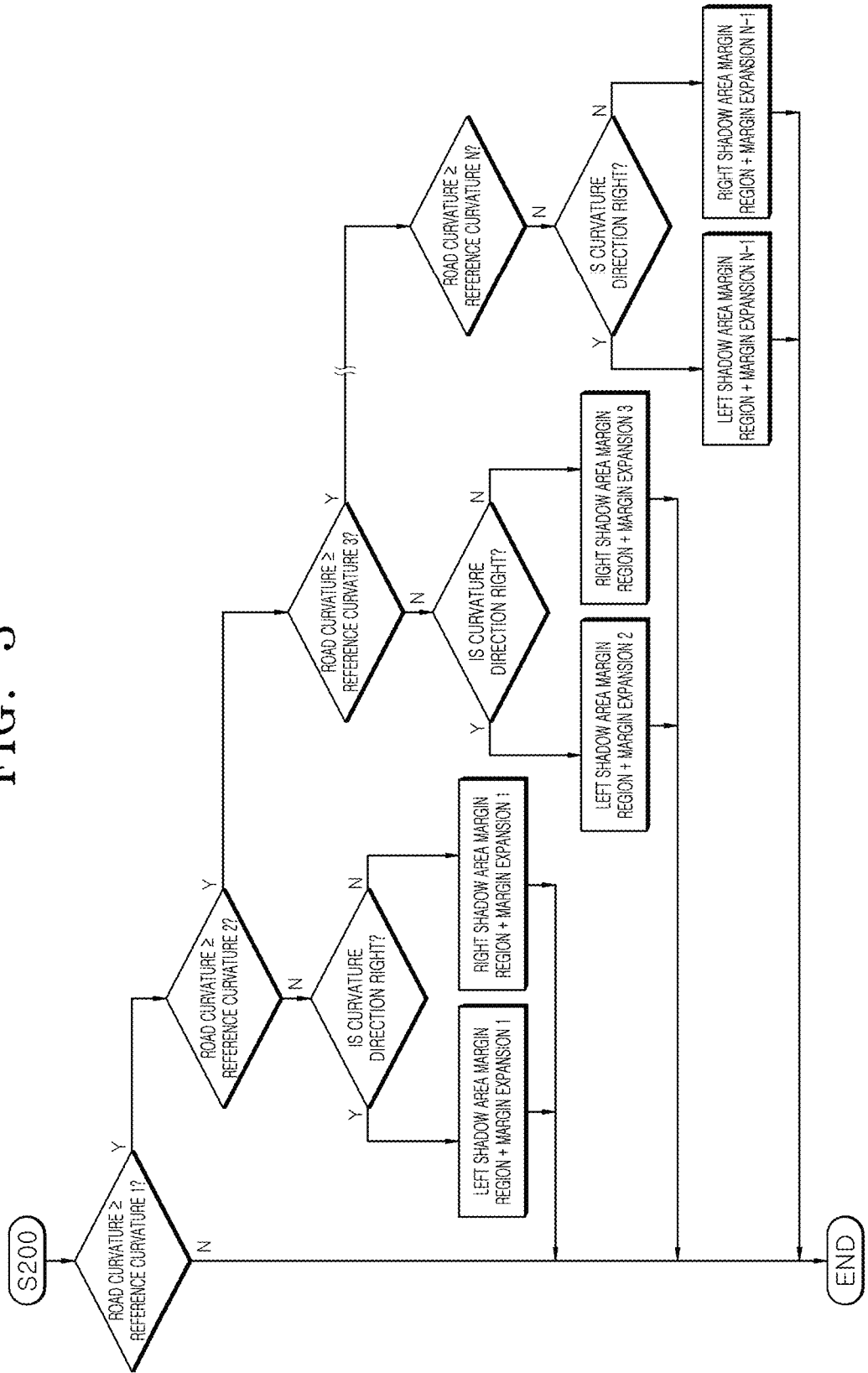

In step S310, the control unit 300 may expand the shadow area margin region only when the magnitude of the curvature of the road is equal to or more than a preset reference curvature. At this time, as the magnitude of the curvature of the road increases, the control unit 300 may further expand the shadow area margin region. Furthermore, in step S310, the control unit 300 may expand the left shadow area margin region when the direction of the curvature of the road is right, and expand the right shadow area margin region when the direction of the curvature of the road is left. FIG. 3 illustrates a specific example of step S310. In FIG. 3, the magnitude of the reference curvature increases from a reference curvature 1 to a reference curvature N, and the magnitude of a margin expansion increases from a margin expansion 1 toward a margin expansion N−1. Here, N is a natural number equal to or more than 1, and may be selected as various values depending on a designer's intention.

The driving state information may include the steering angle of the steering wheel of the vehicle. Thus, step S300 may include step S320 in which the control unit 300 variably adjusts the shadow area margin region based on the magnitude and direction of the steering angle.

In step S320, the control unit 300 may expand the shadow area margin region only when the magnitude of the steering angle is equal to or more than a preset reference steering angle. At this time, as the magnitude of the steering angle is increased, the control unit 300 may further expand the shadow area margin region. Furthermore, in step S320, the control unit 300 may expand the left shadow area margin region when the direction of the steering angle is right, and expand the right shadow area margin region when the direction of the steering angle is left. FIG. 4 illustrates a specific example of step S320. In FIG. 4, the magnitude of the reference steering angle increases from a reference steering angle 1 to a reference steering angle N, and the magnitude of the margin expansion increases from the margin expansion 1 toward the margin expansion N−1. Here, N is a natural number equal to or more than 1, and may be selected as various values depending on a designer's intention.

As such, the headlamp control method in accordance with the embodiment of the present invention can variably adjust the shadow area of the headlamp according to the curvature of the road or the steering state of the vehicle, and optimize the shadow area in a severe driving environment where a relative position between the ego vehicle and the forward vehicle is rapidly changed, thereby removing glare of the driver of the forward vehicle. Therefore, the headlamp control method can compensate for the degradation in adjustment performance of the shadow area due to the limit to the image processing speed of the camera in the related art, thereby improving the performance of the ADB headlamp system.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A headlamp control apparatus of an ego vehicle comprising:
a headlamp configured to emit light for illuminating a road ahead of the ego vehicle;
a control unit configured to control light emission of the headlamp to form a shadow area when a preceding vehicle travels the road for avoiding glare of a driver of the preceding vehicle while the headlamp illuminates the road ahead of the ego vehicle;
an image acquisition unit configured to acquire an image of the preceding vehicle;
a driving information acquisition unit configured to acquire information that comprises a road curvature of the road or a steering angle of a steering wheel of the ego vehicle;
wherein the shadow area comprises a main region determined based on the image of the preceding vehicle and two margin regions located right and left sides of the main region, respectively,
wherein, when there is the road curvature or the steering angle, the control unit is configured to determine whether to expand the margin regions based on a value of the road curvature or the steering angle, and further configured to determine which one of the margin regions to expand based on a direction of the road curvature or the steering angle,
wherein the control unit is configured to determine to expand one of the margin regions based on the direction and the value when there is the road curvature or the steering angle and the value is greater than a preset reference, whereas the control unit is configured to determine not to expand the margin regions, when there is the road curvature or the steering angle and the value is smaller than a preset reference.

2. The headlamp control apparatus of claim 1, wherein one of the margin regions located at the left side of the main region is referred to as a left margin region and the other margin region located at the right side of the main region is referred to as a right margin region, wherein the control unit is configured to expand the left margin region when the direction of the road curvature is right, and further configured to expand the right margin region when the direction of the road curvature of the road is left.

3. The headlamp control apparatus of claim 1, wherein one of the margin regions located at the left side of the main region is referred to as a left margin region and the other margin region located at the right side of the main region is referred to as a right margin region, wherein the control unit is configured to expand the left margin region when the direction of the steering angle is right, and further configured to expand the right margin region when the direction of the steering angle is left.

4. A headlamp control method comprising:
acquiring, by an image acquisition unit, an image of a preceding vehicle that travels a road ahead of an ego vehicle;
acquiring, by a driving information acquisition unit, information that comprises a road curvature of the road or a steering angle of a steering wheel of the ego vehicle; and
operating a control unit to control light emission of a headlamp of the ego vehicle to form a shadow area when the preceding vehicle travels the road for avoiding glare of a driver of the preceding vehicle while controlling the headlamp to illuminate the road ahead of the ego vehicle;

wherein the shadow area comprises a main region determined based on the image of the preceding vehicle and two margin regions located right and left sides of the main region, respectively, wherein, when there is the road curvature or the steering angle, the control unit determines whether to expand the margin regions based on a value of the road curvature or the steering angle, and further determines which one of the margin regions to expand based on a direction of the road curvature or the steering angle, wherein the control unit determines to expand one of the margin regions based on the direction and the value when there is the road curvature or the steering angle and the value is greater than a preset reference, whereas the control unit determines not to expand the margin regions when there is the road curvature or the steering angle and the value is smaller than a preset reference.

5. The headlamp control method of claim 4, wherein one of the margin regions located at the left side of the main region is referred to as a left margin region and the other margin region located at the right side of the main region is referred to as a right margin region, wherein the control unit expands the left margin region when the direction of the curvature of the road is right, and expands the right margin region when the direction of the curvature of the road is left.

6. The headlamp control method of claim 4, wherein one of the margin regions located at the left side of the main region is referred to as a left margin region and the other margin region located at the right side of the main region is referred to as a right margin region, wherein the control unit expands the left margin region when the direction of the steering angle is right, and expands the right margin region when the direction of the steering angle is left.

* * * * *